United States Patent [19]

Taniguchi et al.

[11] Patent Number: 5,032,855
[45] Date of Patent: Jul. 16, 1991

[54] FILM CARTRIDGE

[75] Inventors: Nobuyuki Taniguchi; Manabu Inoue; Toshihiko Ishimura; Toshio Yamaki; Reiji Seki; Atsushi Sumitani, all of Osaka, Japan

[73] Assignee: Minolta Camera Kabushiki Kaisha, Osaka, Japan

[21] Appl. No.: 563,662

[22] Filed: Aug. 3, 1990

Related U.S. Application Data

[63] Continuation of Ser. No. 352,377, May 16, 1989, abandoned.

[30] Foreign Application Priority Data

May 17, 1988 [JP] Japan ................. 63-121270

[51] Int. Cl.$^5$ ............................. G03B 7/00
[52] U.S. Cl. .................... 354/21; 354/289.1; 354/484
[58] Field of Search .......... 354/21, 412, 289.1, 354/484

[56] References Cited

U.S. PATENT DOCUMENTS 4,477,164 10/1984 Nakai et al. .
4,500,183 2/1985 Tanikawa .
4,560,267 12/1985 Nakai et al. .
4,728,978 3/1988 Inoue et al. .
4,733,263 3/1988 Taniguchi et al. .
4,733,265 3/1988 Haraguchi et al. ............. 354/484
4,780,735 10/1988 Taniguchi et al. .
4,806,960 2/1989 Momot et al. ............... 354/21
4,855,779 8/1989 Ishikawa et al. .............. 354/289.1

*Primary Examiner*—Russell E. Adams
*Attorney, Agent, or Firm*—Burns, Doane, Swecker & Mathis

[57] ABSTRACT

A film cartridge comprises a chamber in which a film is contained and a semiconductor memory such as non-volatile memory, e.g., E$^2$PROM having a plurality of memory areas for storing various kinds of photographing data of each photography. In this semiconductor memory, photographing data are stored in different areas at each photographing and therefore the preceding photographing data stored in the memory are not deleted by this time photographing and photographing data of a desired film frame are accessible. Data used at a photo processing shop and a photofinishing laboratory can be also stored in the memory of the film cartridge.

27 Claims, 14 Drawing Sheets

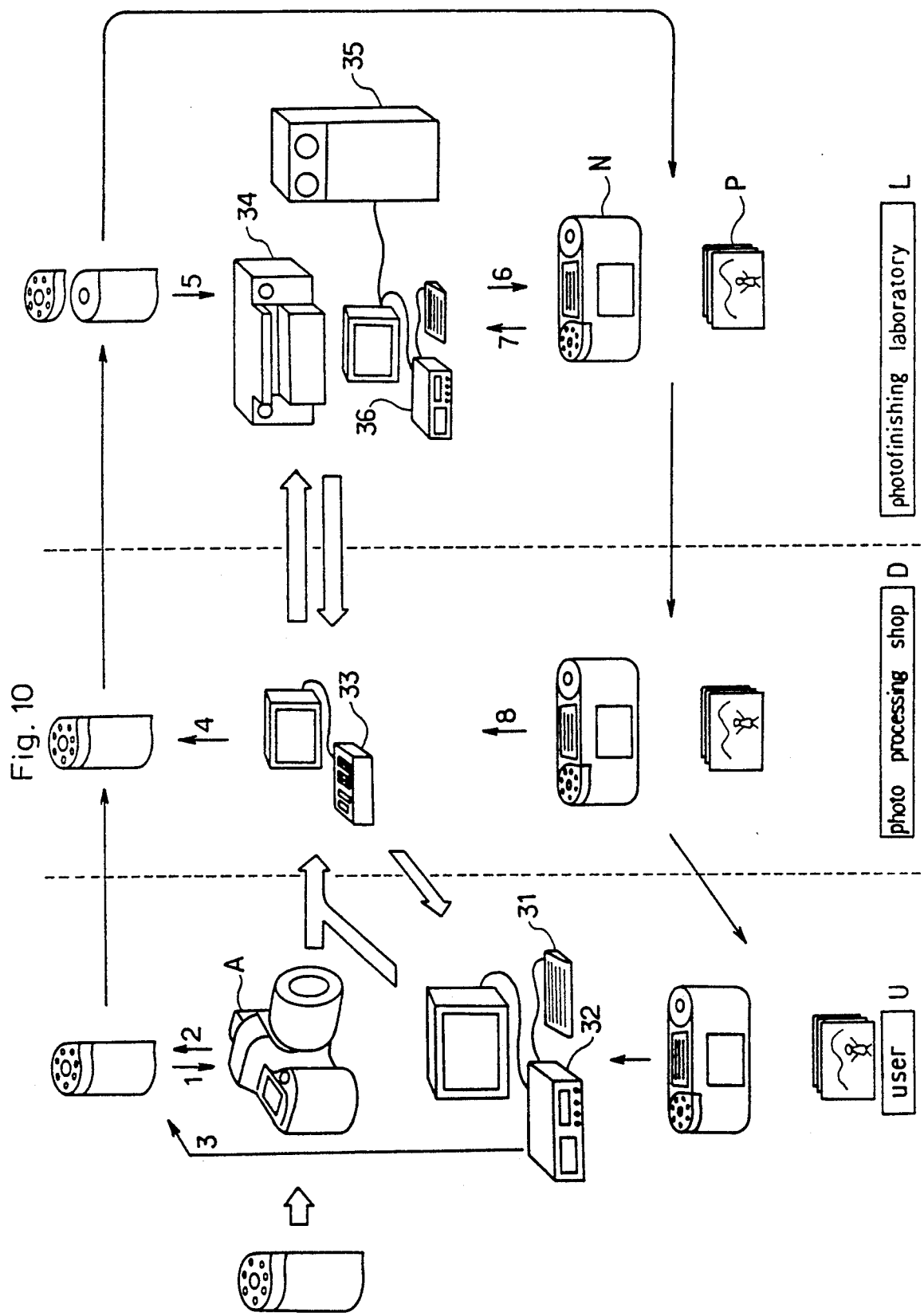

5,032,855

FILM CARTRIDGE

This application is a continuation of application Ser. No. 07/352,377, filed May 16, 1989 now abandoned.

BACKGROUND OF THE INVENTION AND RELATED ARTS

A film cartridge having a semiconductor memory such as Random Access Memory (RAM) is conventionally known. For example, in U.S. Pat. No. 4,500,183, disclosed is a film cartridge having a RAM for storing film information such as ASA information and photographic information such as exposure correction data.

However, in a film cartridge disclosed in U.S. Pat. No. 4,500,183, information stored in the RAM is updated at every photographing time, and as a result, previously stored photographing information is disadvantageously deleted and it is impossible to know the same.

SUMMARY OF THE INVENTION

Accordingly, an object of the present invention is to provide a film cartridge having a semiconductor memory in which previously stored photographing information can be prevented from being deleted.

In order to achieve this object, a film cartridge according to the present invention is characterized by having a semiconductor memory in which photographing information is stored in a different memory area at each photographing time.

BRIEF DESCRIPTION, OF THE DRAWINGS

FIG. 10 is a view showing a photographing system using a film container to which the present invention is applied;

Figure 11A:
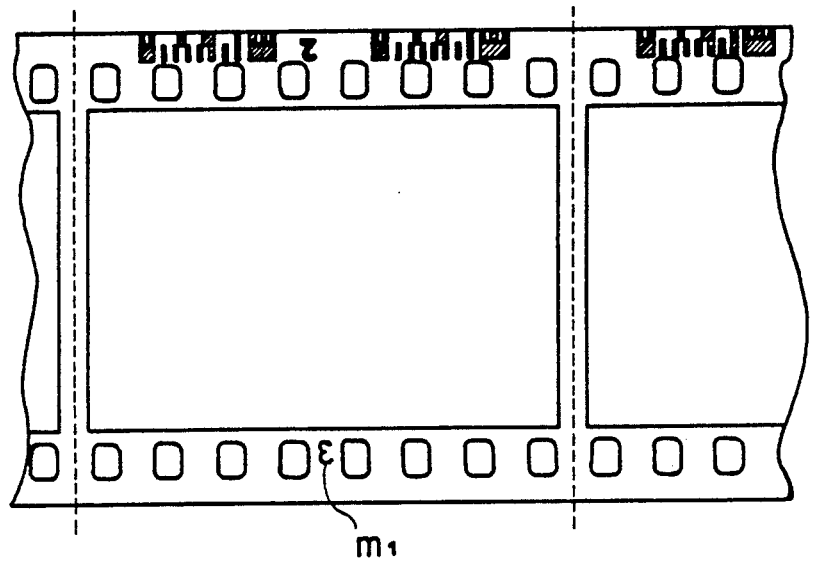
Figure 12:
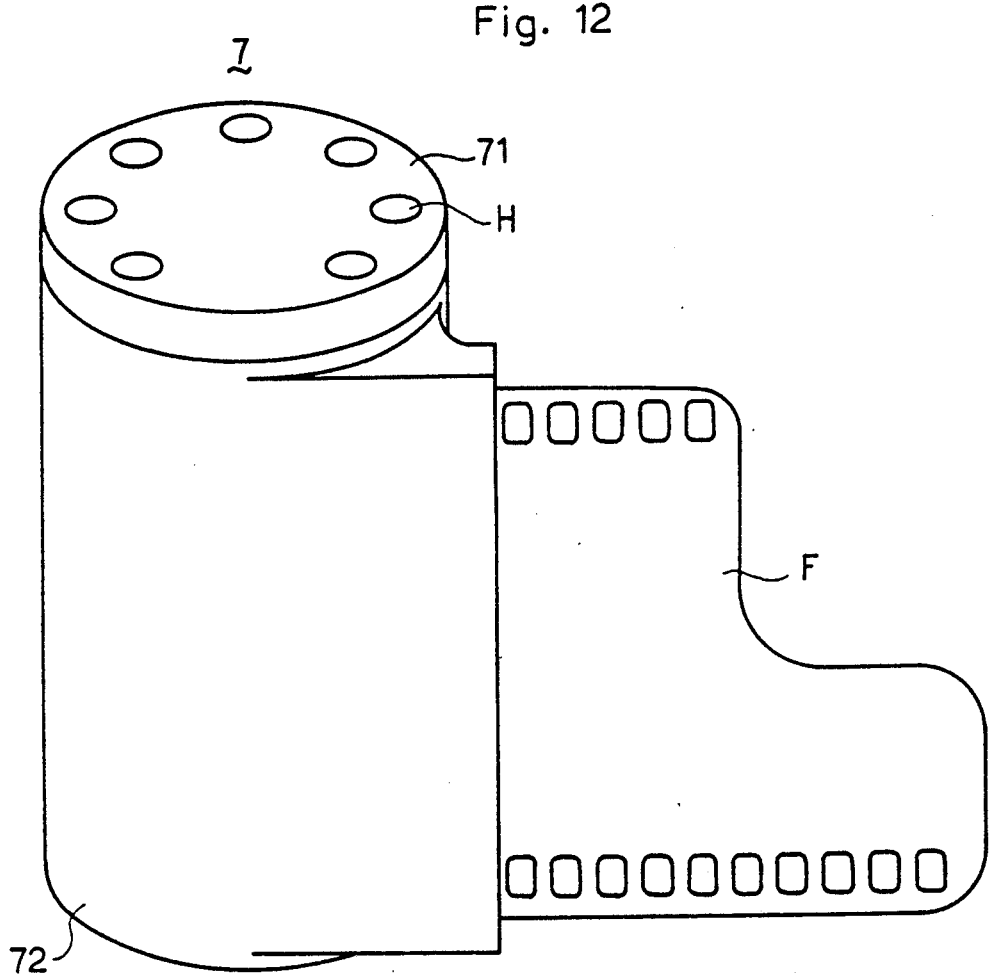
Figure 13:
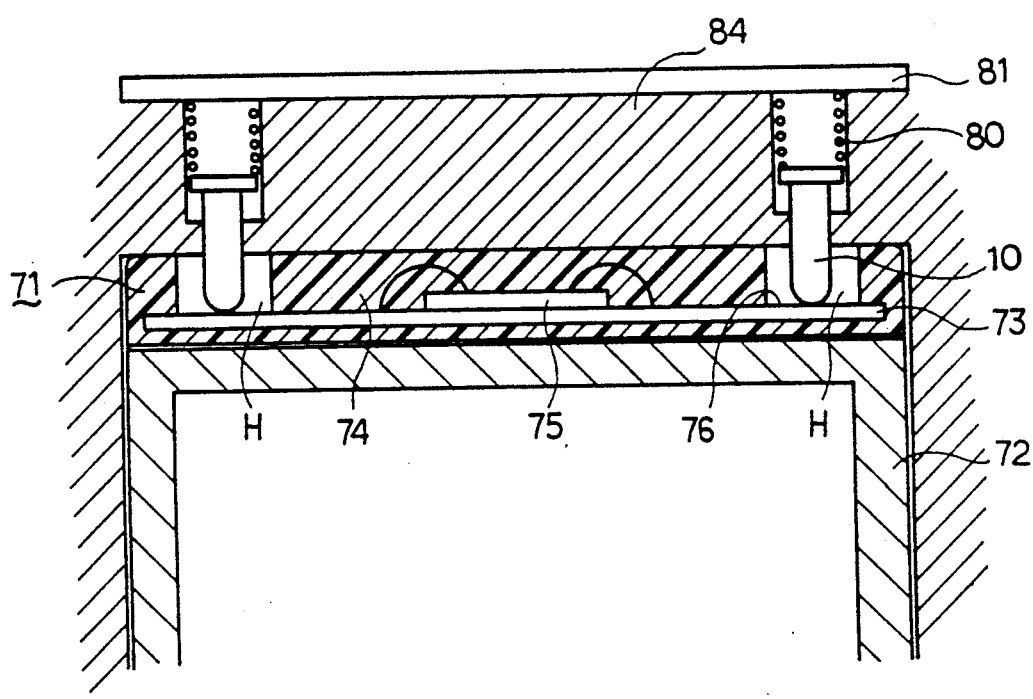
Figure 14A:
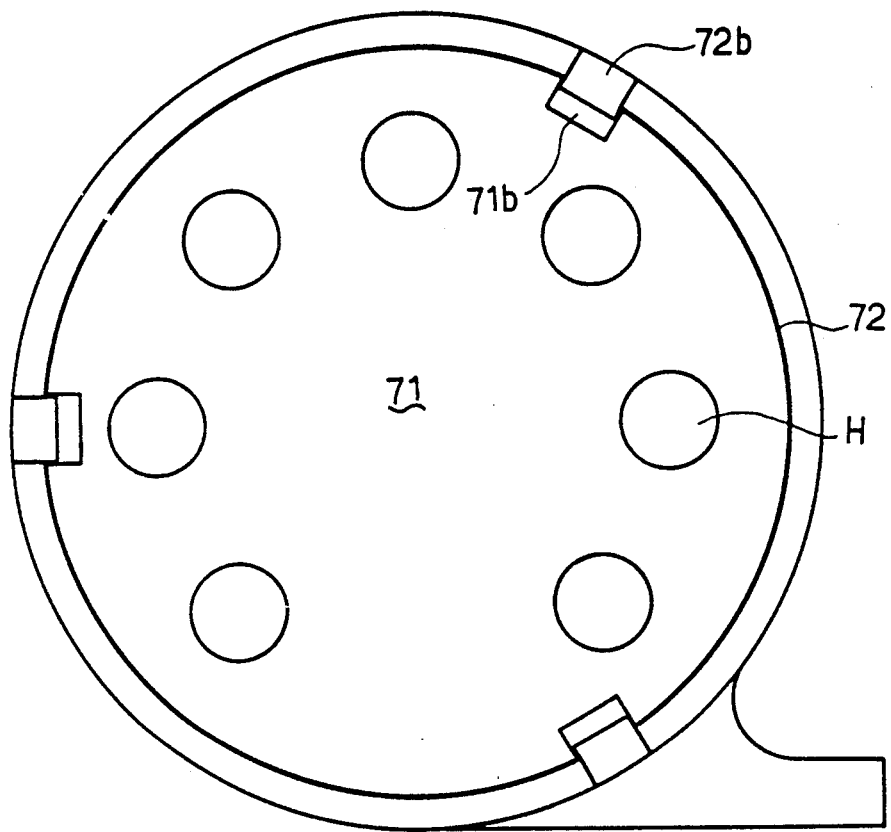
Figure 14B:
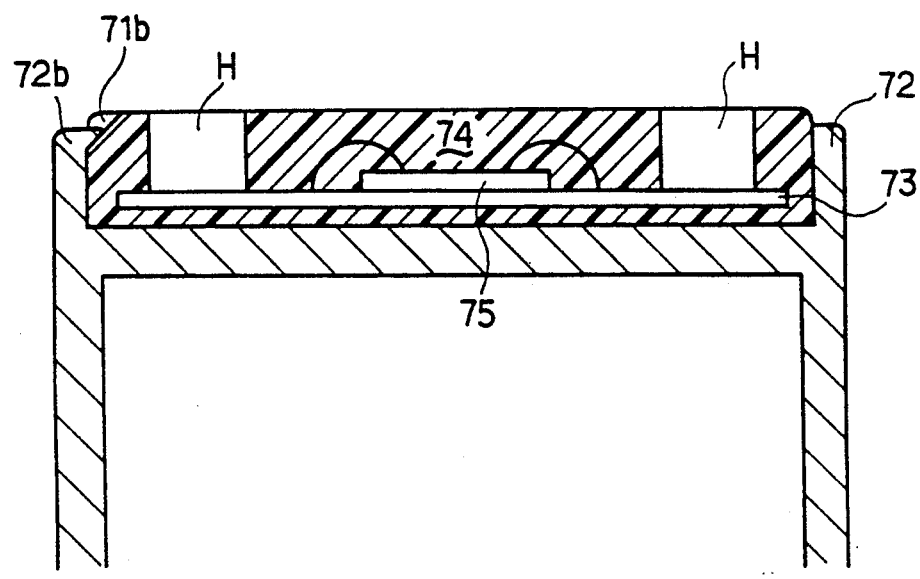
Figure 17:
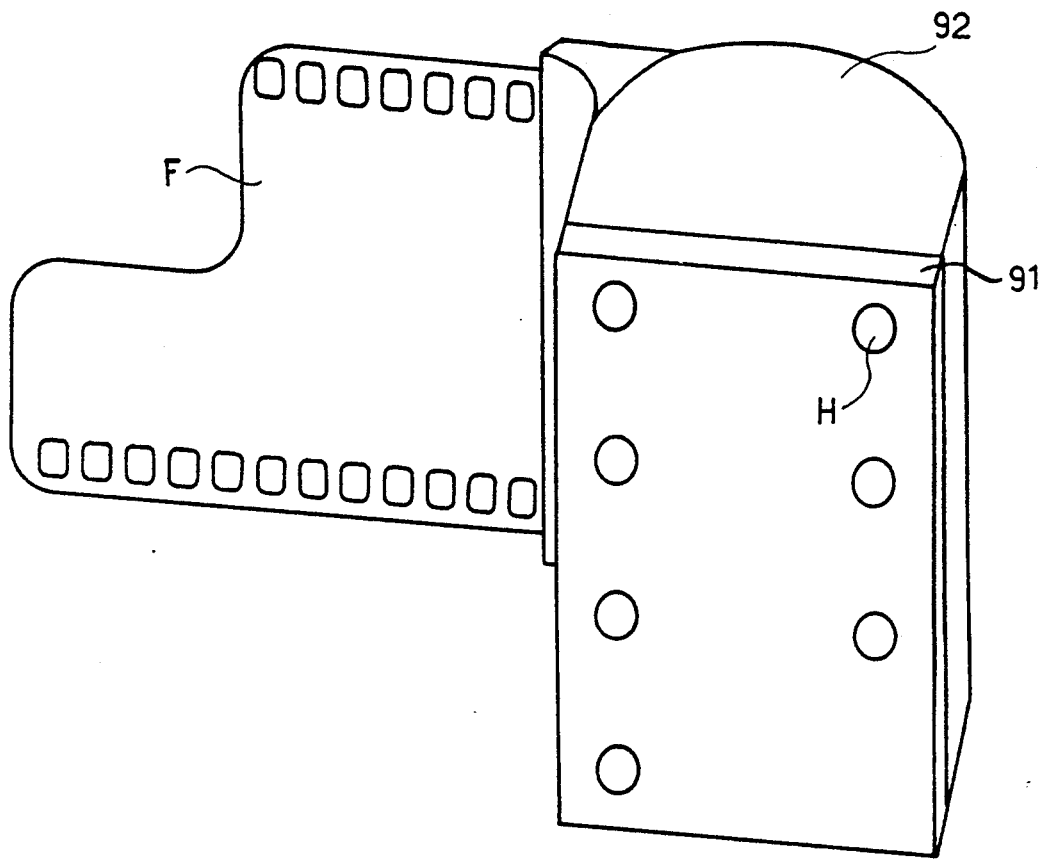
Figure 18:
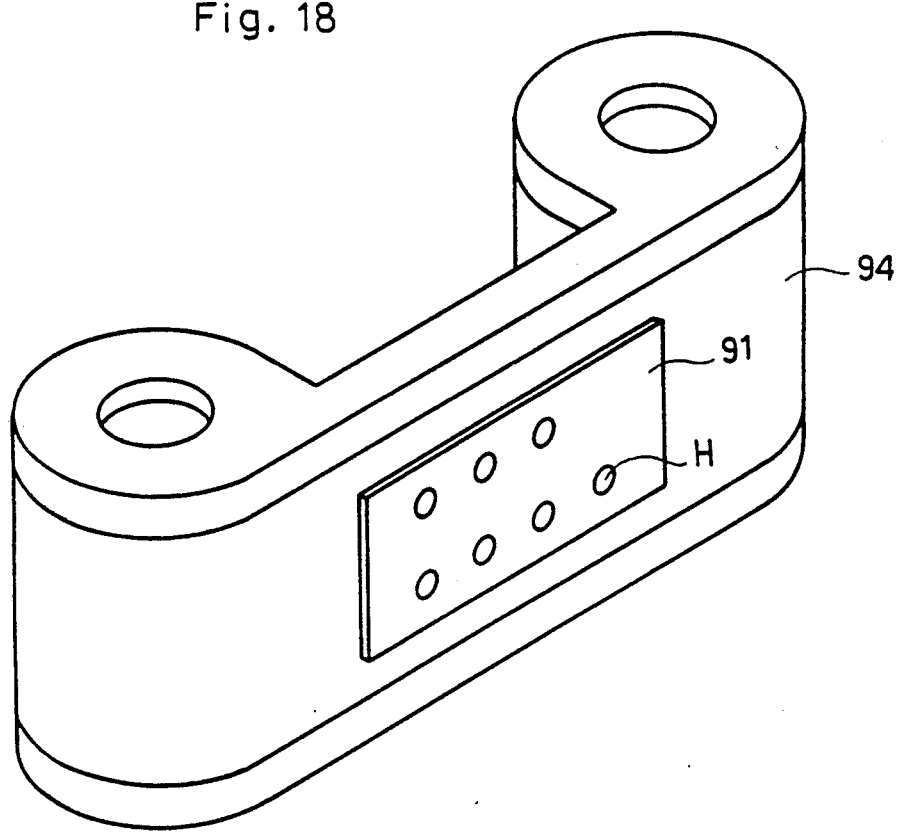

FIGS. 11(A) and (B) are views showing a film in which marks for corresponding a film frame to the address of the memory are imprinted;

FIG. 12 is a perspective view of an embodiment of a film container to which the present invention is applied;

FIG. 13 is a sectional view showing the installation of the film container to a camera;

FIGS. 14-A, 14-B, 15-A, 15-B, 16-A and 16-B are top views and sectional views respectively showing other embodiments of a film container to which the present invention is applied; and FIG. 17 and 18 are views showing other embodiments of a film container to which the present invention is applied.

DESCRIPTION OF THE PREFERRED EMBODIMENTS OF THE INVENTION

Now, the present invention will be described in detail with reference to embodiments thereof shown in the appended drawings.

FIGS. 1(A) and 1(B) are a top and a back views showing a camera in which an embodiment of a film cartridge according to the present invention is used.

Referring to reference marks and numerals in FIG. 1(A), A stands for a photographic camera, 1 for a camera body, 2 for a shutter release button, 3 for a light intake window, 4 for a group of setting switches for setting various information and 5 stands for a display section for displaying the various information respectively.

The light intake window 3 is constituted by a milky white plate and at a lower portion thereof, a color measuring sensor is disposed. The group of setting switches 4 includes switches for setting various information such as a time value (shutter speed) Tv, an aperture value Av, film speed value Sv (ISO), an exposure mode, a pseudo format mode, a drive mode, an exposure reference and the like, and also includes an up/down switch for increment and decrement operations needed for the setting data or modes. The display section 5 includes at a backward region thereof (a lower region in the figure) a portion 5a for displaying whether a film cartridge having a memory is loaded or not, and the display section includes at a forward region thereof (an upper region in the figure) a portion 5b for displaying the various photographic information. The display portion 5a is adapted to blink to provide a warning in case the film cartridge is loaded.

Figure 6:
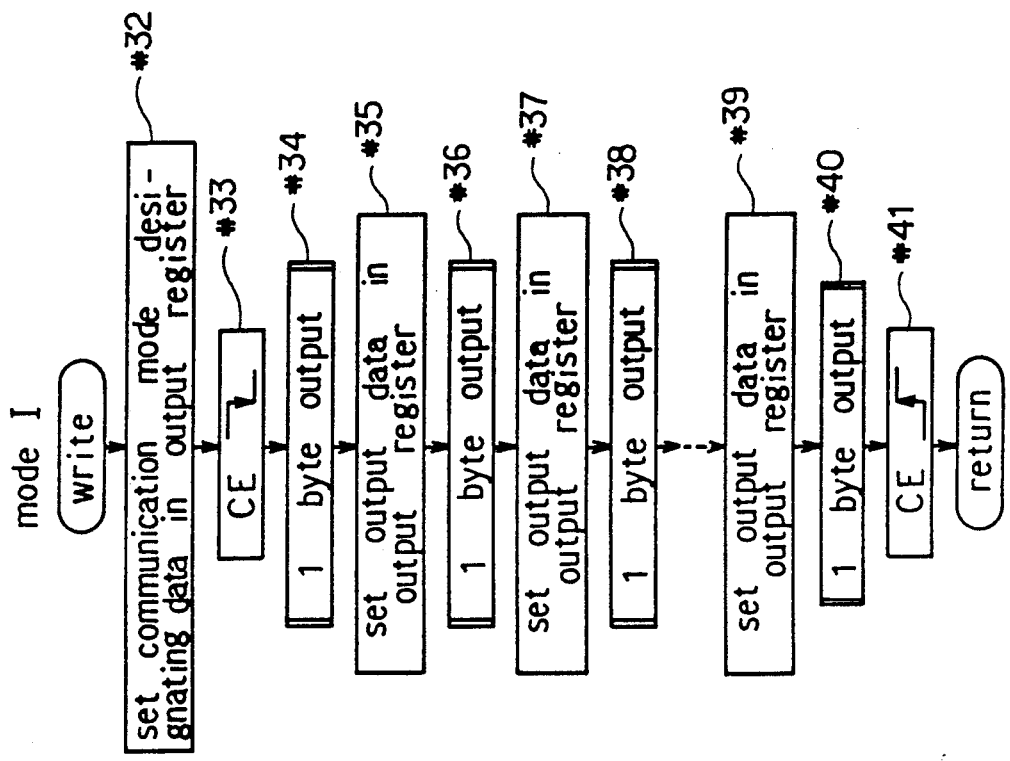
FIG. 6 is a flow chart of writing-in operation of a writer which writes in information into the memory contained in the cartridge without designating the address of the memory.

Referring to reference marks and numerals in FIG. 1b, 6 stands for a viewfinder, 7 for a film cartridge, F for a film, 9 for a spool, and 10 for terminals for transmitting signal between the memory built in the film cartridge 7 and the camera body 1. 11 stands for an imager frame and 12 for a light emitting diode for imprinting a mark for referring an address of the memory to a frame number of the film.

Figure 1:
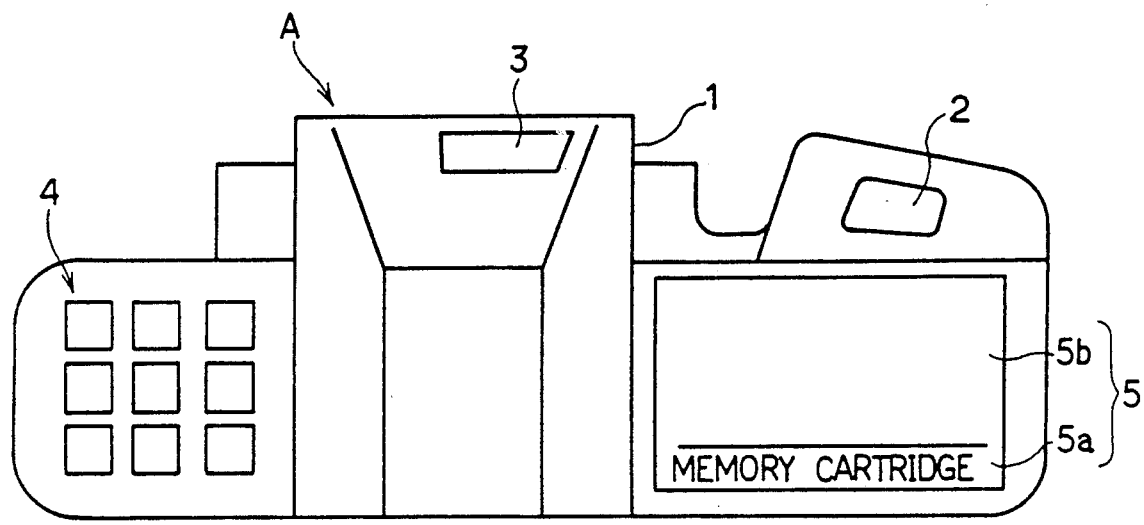
FIG. 1(A) is a top view of a camera using a film container to which the present invention is applied.
FIG. 1(B) is a back view of the camera of FIG. 1(A)
Figure 1:
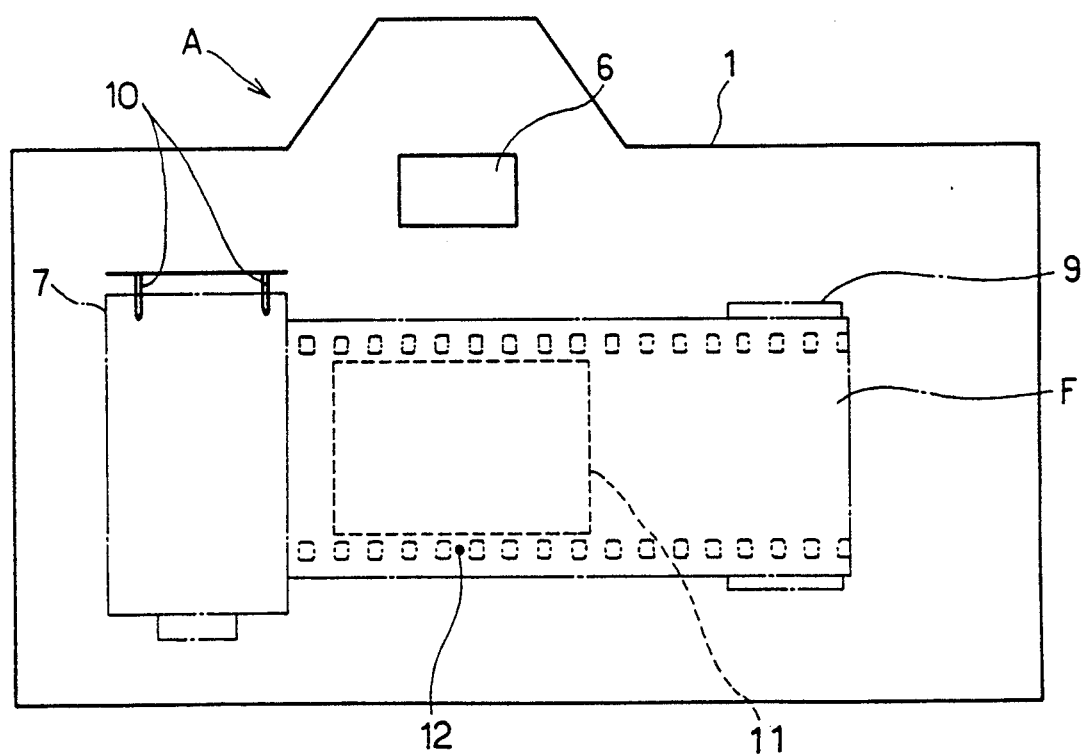
Figure 2:
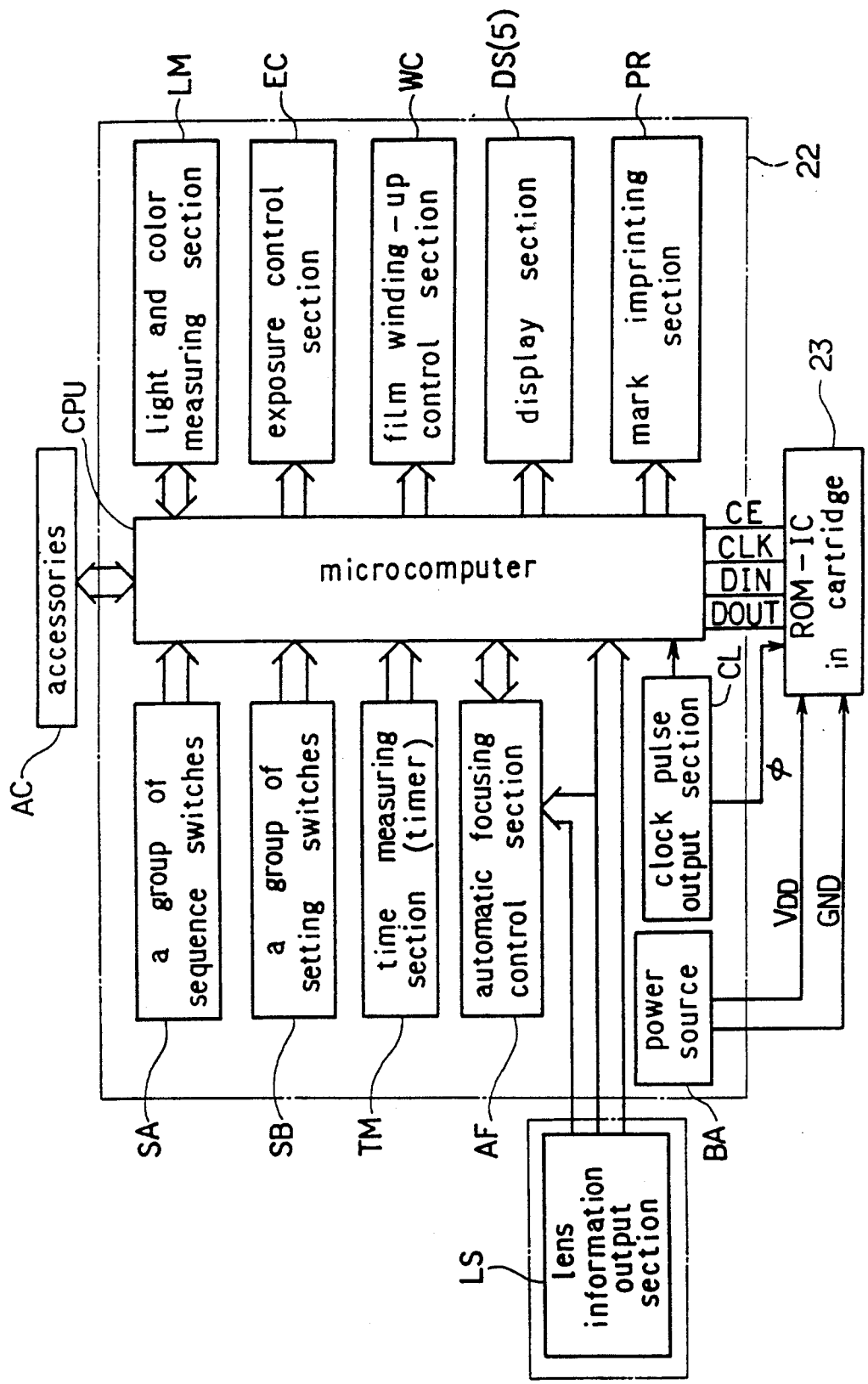
FIG. 2 is a block diagram of a camera using a film container to which the present invention is applied and the film container.

FIG. 2 is a block circuit diagram showing the whole system of the photographic camera shown in FIG. 1.

In FIG. 2, a portion surrounded by a dotted line 22 is installed in the camera body 1. A reference mark CPU denotes a microcomputer for controlling the whole of the camera. A reference mark LM denotes a light and color measuring section which measures luminance and color of an object and then outputs as digital signals light corresponding to the measured luminance and color to the microcomputer CPU. A reference mark EC denotes an exposure control section, which controls a shutter speed and a diaphragm aperture based on the values Tv and Av obtained by the microcomputer CPU. A reference mark WC denotes a film winding-up control section, which controls a motor (not shown) for winding-up and rewinding the film F and cocking various mechanisms such as the shutter and mirror. A reference mark DS denotes a display section for displaying the various photographic information. This displaying section DS corresponds to the display section 5 in FIG. 1. A reference mark PR denotes a mark imprinting section for imprinting the mark. This mark will be described later. A reference mark SA denotes a group of sequence switches including a shutter release switch, a switch for detecting a completion of the film winding-up operation and other switches. The microcomputer CPU carries out sequential controls such as a shutter release—an exposure—a film winding-up—a film rewinding, and so on. A reference mark SB denotes a group of setting switches corresponding to the group of setting switches 4 in FIG. 1. This group of setting switches SB includes switches for setting a shutter speed and an aperture value, a switch for changing the exposure mode, a switch for setting the pseudo format made, and a switch for setting the exposure reference and other switches. A reference mark TM denotes a timer. A mark AF denotes an automatic focusing control section for measuring distance and for controlling a lens. A mark LS denotes a lens information output section for outputting lens information concerning photographing and automatic focusing operation. A mark BA denotes a power source equipped in the camera body 1 and adapted for supplying power to the microcomputer CPU and to other circuits. A mark CL denotes a clock pulse generating section for outputting clock pulses to the microcomputer CPU and a memory 23 in the cartridge 7. A mark AC denotes accessories such as an electronic flash device, a data imprinting device (data back), a lens, a winder and the like.

Figure 3:
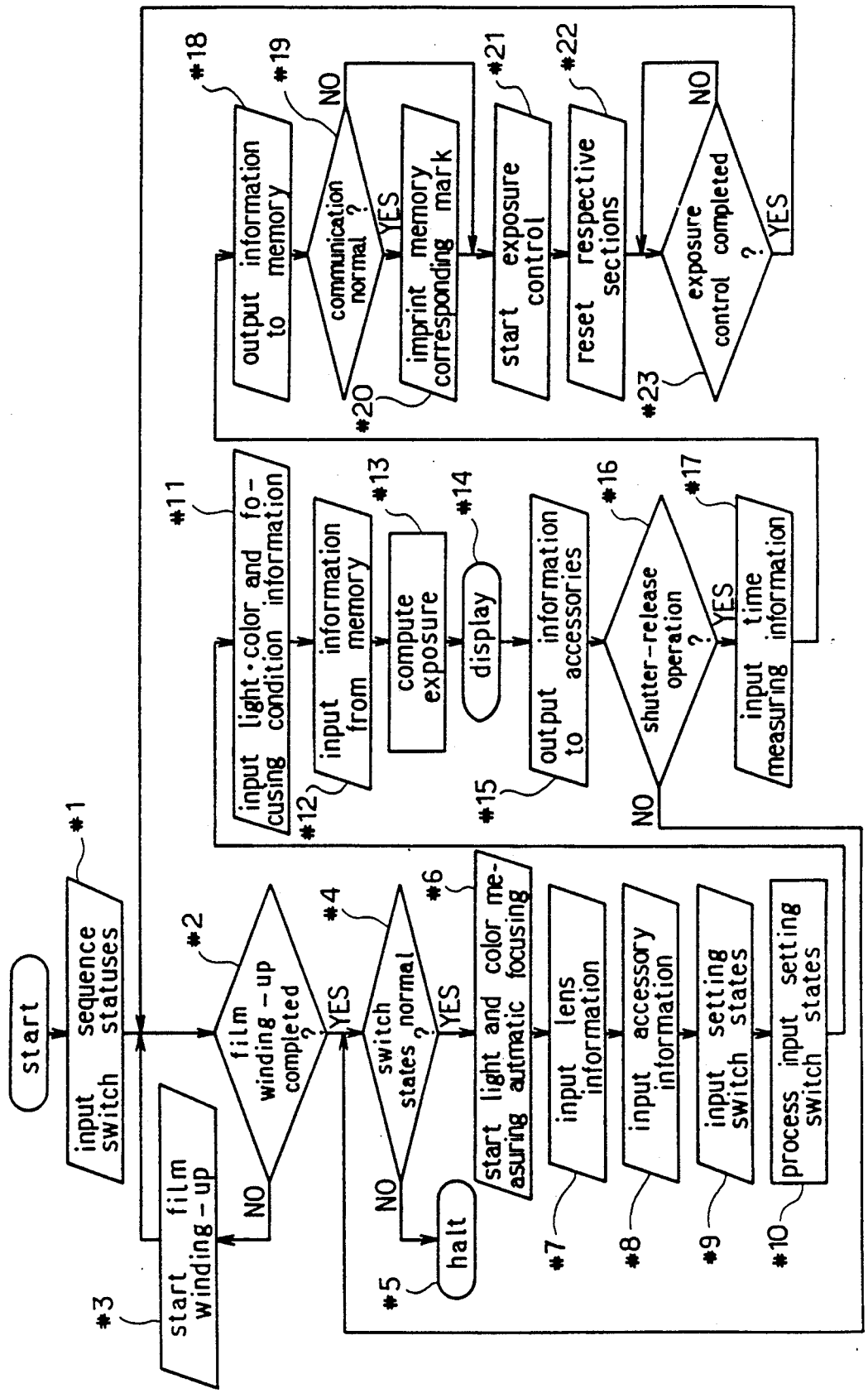
FIG. 3 is a flow chart showing operation of a microcomputer CPU shown in FIG. 2.

FIG. 3 is a schematic flow chart showing operations of the microcomputer CPU in the camera body 1. Now, these operations will be described in the following.

The microcomputer CPU is energized, for example, by turning on the power source BA of the camera body 1 or by turning on the light measuring switch. At step #1, statuses of the group of sequence switches SA are input. At step #2, it is judged whether or not a winding-up operation of the film F has been completed. If not, the process goes on to step #3 to start winding-up the film F and returns to the step #3. This operation is continued till the film winding operation is completed. With the completion, the process goes on to the step #4 to judge whether or not all the other switches except the winding-up completion switch of the sequence switches are in normal states thereof, i.e, whether or not a photographic operation is possible. If not, the process goes on to step #5 to stop the microcomputer CPU. On the other hand, if all the switches are judged to be normal states thereof, the process goes to step #6 to provide start signals to the light and color measuring section LM and the automatic focusing control section AF whereby light and color measuring operations and the distance measuring operation are started.

Next, at step 7, lens information is inputted from the lens information output section LS. At step #8, accessory information is input from the accessories AC. Then, at step #9, statuses of the setting switches SB are inputted. At step #10, the inputted information concerning the statuses of the setting switches SB are processed. More particularly, it is judged whether or not any of the shutter speed, the aperture value, the exposure mode, the pseudo format mode, the reference of the exposure and the like has been changed through the setting switches SB. If changed, a process corresponding to this change is executed.

At step #11, results of the light, color and distance measuring operations started at step #6 are inputted.

At step #12, information needed for photographing operation, e.g. a film speed and a number of film frames are inputted from the memory 23 in the film cartridge 7. Data communication with the memory 23 in the film cartridge executed at step #12 and the belowmentioned steps #18 will be described later in detail. Then, at step #13, based on the information inputted at steps from #7 to #12 exposure computation is carried out to obtain data needed for exposure control, e.g. a suffer speed Tv, an aperture value Av and the like. At step #14, the computed values are displayed by the display section DS. At step #15, the computed values and other information needed for the accessories AC are outputted to the accessories AC.

At step #16, it is judged whether or not the shutter release operation has been carried out. If not, the process returns to step #4. In other words, the microcomputer CPU repeatedly executes a sequence of operations from step #4 to step #15 until the shutter release operation is carried out.

It may be programmed that this sequence of operations are stopped when the shutter release operation has not been carried out within a predetermined time. Otherwise, it may be programmed that this sequence of operations are repeated only while a light measuring switch is turned on (not shown).

If the shutter release operation has been carried out at step #16, the process goes on to step #17 to input time information from the timer TM. Then at step #18, communication with the memory in the film cartridge is carried out, whereby various kinds of information outputted from the camera body 1 are stored in the memory in the film cartridge.

After the communication is completed, at step #19 it is judged whether or not the communication has been carried out normally. If so, the program goes on to step #20 to imprint on the film F a mark indicating the correspondence between an address of the memory in the film cartridge and the film for which the information is stored in the memory accessed by this address. More particularly, this imprinting operation is carried out by illuminating the light emitting diode 12 of the mark imprinting section PR. The purpose of this mark imprinting operation is to correspond a photographing number of the film F to an address of the memory in the film cartridge in which, a predetermined information for this photographing number of the film, e.g. the pseudo format information, color temperature information, a frame number, a number of printing, the exposure reference information, dates, time, other various photographing information, and the information used at the photofinishing laboratory, are stored.

After the mark imprinting operation is completed at step #20 or if it is judged at step #19 that the communication has not been carried out normally, the process goes on to step #21. At step #21, an exposure control is started which controls the shutter, the aperture diaphragm and the like based on the data needed for the exposure control obtained at step #13 including the shutter speed Tv, the aperture value Av and so on. At the next step #22, signals indicating the execution of the shutter release operation are outputted to the respective sections thereby to reset the same. At step #23, the process waits until completion of the exposure control and then returns to step #2. And the operations of steps #2 and #3 are repeated again until the winding-up operation of the film F is completed. At this time, a film frame counter is incremented (1 is added to the film frame counter). And then, the abovementioned operation from the step #4 is repeated. In place of repeating the abovementioned operations from step #4, the process may be so varied as to stop the microcomputer CPU while the light measuring switch (not shown) is kept turning on.

Further, in place of incrementing the film frame counter, the process may be so varied as to input a content of an address counter in the memory in the film cartridge, calculate the photographing film frame number and indicate the same in the film frame counter.

Operations executed in the camera further include changing scope of visual field of the viewfinder, exposure calculation and changing illuminating angle of a flashlight in accordance with a pseudo focal length (a focal length determined by combination of a focal length of a photographing lens and a enlargement ratio of pseudo telephoto mode), limiting the pseudo focal length in accordance with a limit data of the enlargement ratio of pseudo telephoto mode (a limit of enlarging magnification in printing with enlargement for ensuring suitable grainness of a printed picture) outputted from the ROM-IC 23, forbidding pseudo telephoto mode when a data indicating that a positive film is loaded is inputted from the ROM-IC 23, judging whether or not the validity of the film has expired based on the data indicating the period of the validity of the film, which is outputted from the ROM-IC 23 and the contents of the timer TM, by giving a caution and/or forbidding photographing operation of the camera if the film is no longer valid, and other operations. It is to be noted that the detailed explanation of the pseudo telephoto mode is given e.g., in U.S. Pat. No. 4,780,735.

Figure 11B:
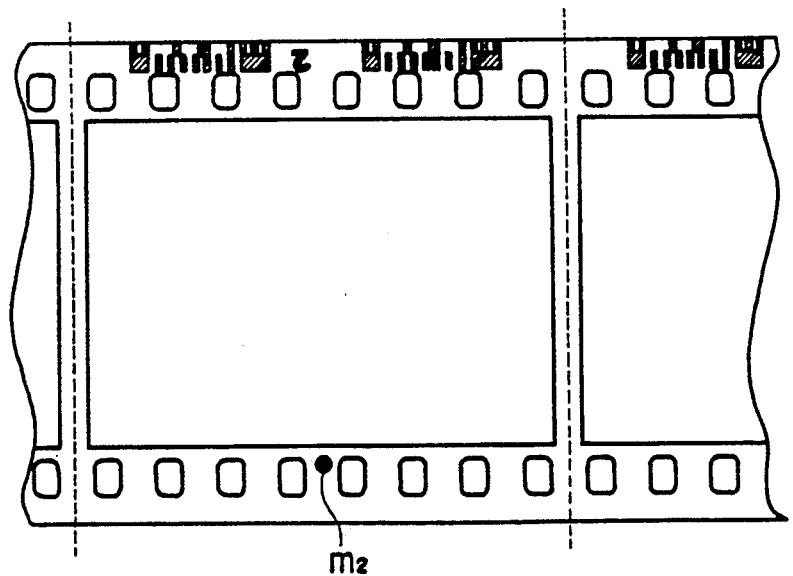

Further, in a camera of the abovementioned embodiment, a light emitting diode 12 is provided for imprinting a mark for corresponding address of the memory in ROM-IC 23 to a film frame number. The mark to be imprinted may be a code (e.g. bar code) easily readable in a film processing (developing and printing) system and changeable at every film frame, or a numeral which a user can confirm with his eyes on the developed film as shown in FIG. 11(A). Otherwise, it may be a point imprinted as shown in FIG. 11(B). In this case, a film frame can be corresponded to its address of the memory by counting the imprinted marks. Further, a mark may be imprinted only on the first frame of the film. In this case, in the following film frames, photographed images are directly detected and by counting the images the film frame can be corresponded to its address of the memory. Further, a particular mark (e.g. a notch) may be provided on the first frame of the film and the photographing is started from that frame. In this case, a film frame can be corresponded to its address of the memory by directly detecting the photographed images and counting them. Further, a code or a film frame number may be preliminarily imprinted as latent images on the edge of a film (out of the frame) and a notch may be provided for detecting position of a film frame by a film maker. In this case, the position of the film frame is decided through the notch and a film frame can be corresponded to its address by the code or the film frame number imprinted as latent images. Furthermore, in place of the latent images, a code may be provided by notching an edge of a film.

Figure 4:
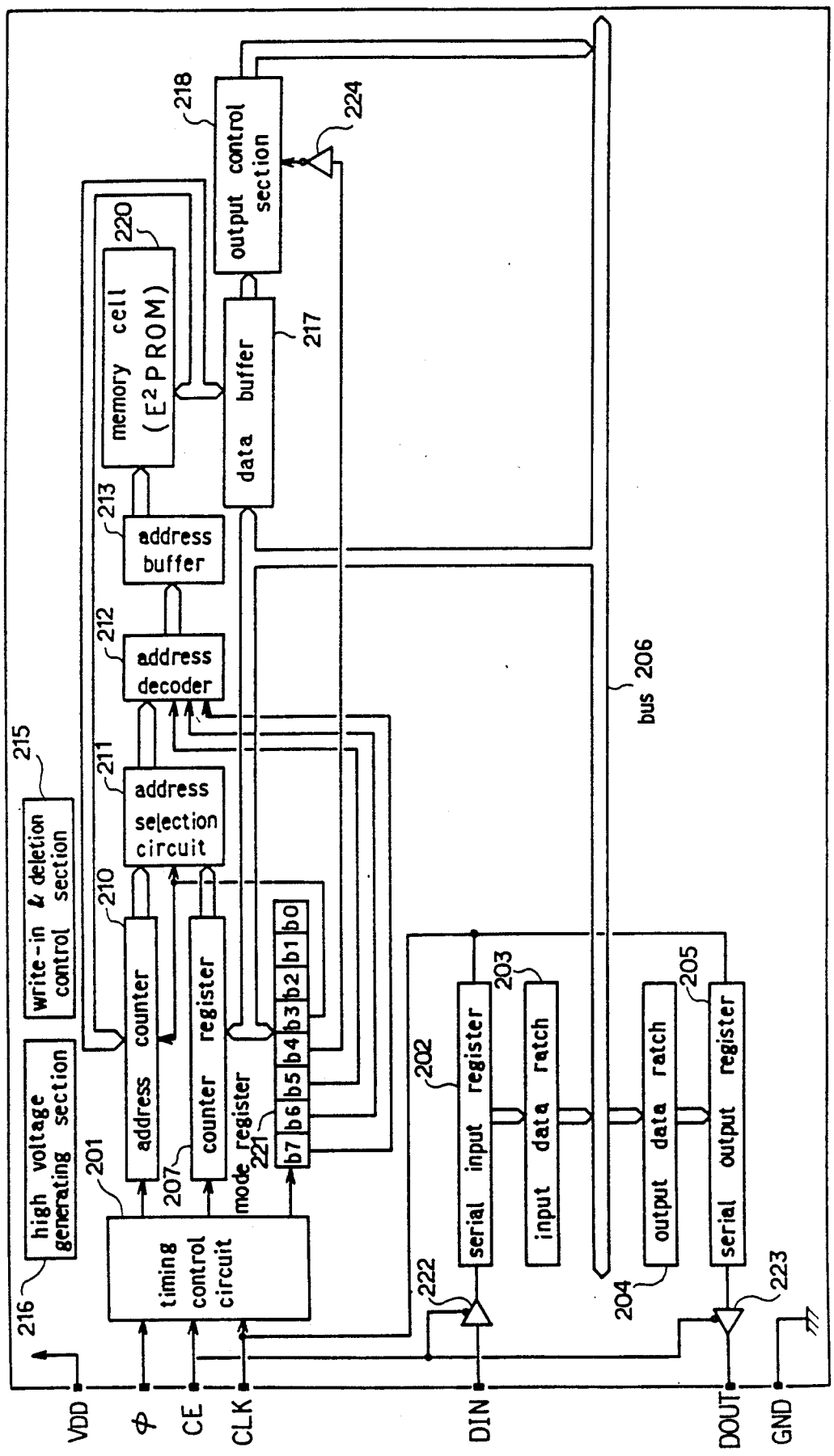
FIG. 4 is a circuit block diagram of an IC circuit including a nonvolatile memory contained in a cartridge.

Now, ROM-IC 23 will be described in the following with reference to FIG. 4.

ROM-IC 23 has seven terminals for communication with outside device (e.g. camera) and for supplying a power source. $V_{DD}$ and GND are terminals for the power source. o is a terminal for inputting from outside a system clock for operation of the circuit. CE is a terminal for inputting from outside a circuit selection signal having functions of controlling operation of the circuit and controlling data input and output through serial data input and output terminals DIN, DOUT. When a low level signal is inputted to the terminal CE, the data communication is enable. CLK, DIN and DOUT are terminals for serial communication and are a serial clock input terminal, a serial data input terminal and a serial data output terminal, respectively. Through these three lines, ROM-IC 23 executes data communication with the outside.

When the film cartridge including the ROM-IC 23 is loaded into the camera, the ROM-IC 23 is supplied from the camera with electric power through $V_{DD}$ and GND and with system clock through the terminal o.

The circuit selection signal CE is inputted into a timing control circuit 201 and at the same time into gates of switch buffers 222, 223. When the signal CE turns from a High level (hereinafter referred to only as H) to a Low level (hereinafter referred to only as L), the terminals DIN, DOUT are electrically connected through the switch buffers 222, 223 to a serial data input register and a serial data output register, respectively. After the signal CE turns to L, in synchronism with a serial clock pulse inputted through the terminal CLK, serial data are inputted through the terminal DIN into the serial data input register 202 and latched in an input data latch circuit 203.

A first byte of data inputted from outside is latched in a mode register 221 in accordance with control by the timing control circuit 201. The mode register 221 is an eight-bit register, upper three bits b7, b6, b5 of which are, as address signals for designating upper three bits of addresses of a memory cell 220, connected to an address decoder 212. A fifth bit b4 of the mode register 221 is a control signal for designating whether the mode is a write-in mode for storing data into the memory cell 220 or a read-out mode for reading data from the memory cell 220, and it is connected through an inverter 224 to an output control section 218. In the write-in mode, transfer of data from the output control section 218 to a bus 206 is forbidden. On the other hand, in the read-out mode, data from a data buffer 217 is transferred through the output control section 218 and the bus 206 to the data latch circuit 204 and latched there. The latched data is transferred to the serial output register 205.

A fourth bit b3 of the mode register 221 is a control bit for controlling an access to the memory cell 220, and is connected to an address counter 210 and an address selection circuit 211. When this control bit is 1, a sequential access mode is selected, in which any address for the memory cell 220 is not designated from outside devices but an address signal generated from the address counter 210 becomes the address for the memory cell 220. In other words, when the fourth bit b3 of the mode register 221 is 1, the address selection circuit 211 transfers the signal outputted from the address counter 210 to an address decoder 212. Addresses are set in the address counter 210 by the timing control circuit 201 so that every time information for one film frame is written in the memory cell 220 the address advances to the next one.

When the control bit b3 of the mode register 221 is 0, a random access mode is selected, in which an address for the memory cell 220 is inputted from the outside through the terminal DIN as the second byte of the addresses of the serial data. This address data is preset into a counter register 207. This data is transferred through the address selection circuit 211 to the address decoder 212 and further transferred to an address buffer 213 to become an address designating data. The counter register 207 is so controlled by the timing control circuit 201 as not to designate an address every time when some data are continuously transferred but to be automatically incremented while the signal CE is L.

Further, a reading-out and deleting control section 215 for controlling reading-out of and writing-in the memory cell 220 and a high voltage generating section 216 peculiar to E²PROM are connected to the memory cell 220.

FIGS. 5 to 8 are flow charts of sequences of data communication between the memory in the film cartridge and the device which can communicate with the memory.

In each figure, Modes I, II denote ways of access to the memory in the film cartridge. Mode I is a sequential access mode in which data are written-in or read-out without designating addresses. Mode II is a random access mode in which addresses to write-in or read-out data are designated. Mode I is easier to deal with than Mode II, but in that mode, the number of data to deal with is limited since a specified one of many data cannot be designated. In Mode II, being a random access mode, it is possible to deal with necessary data only and therefore to deal with a lot of data. However, in Mode II, it is disadvantageous that complicated operations are needed.

A memory in a film cartridge of this embodiment is adapted to be applicable to both of Modes I, II as abovementioned.

Figure 5:
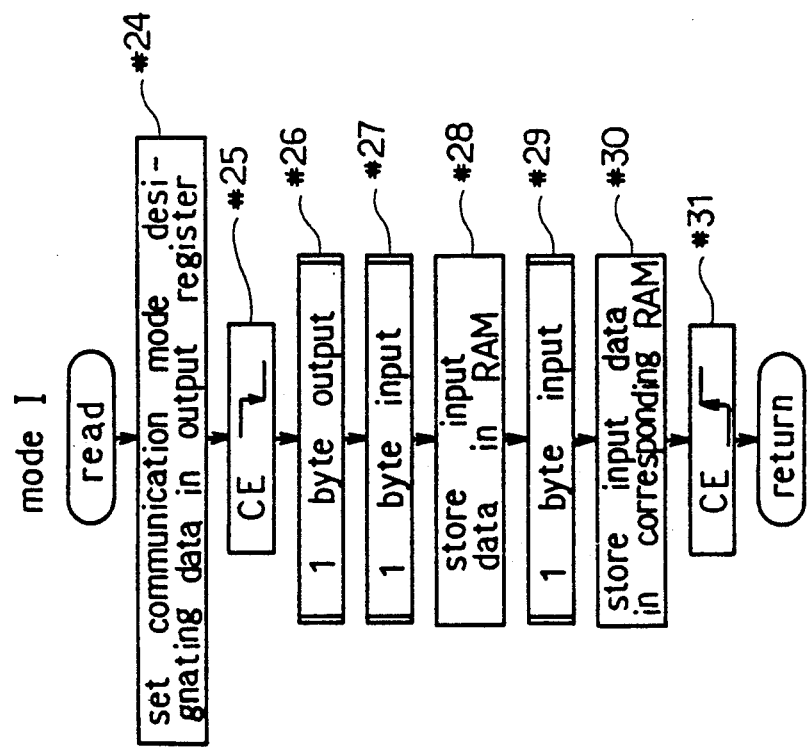
FIG. 5 is a flow chart of reading-out operation of a reader which reads out information stored in the memory contained in the cartridge without designating its address.

Firstly, a routine of reading-out of data in Mode I will be described with reference to FIG. 5. At step #24, communication mode designating data are set in the serial output register in CPU. The communication mode designating data are constituted by 8 bits of data, and each bit is made to have such a meaning as to corresponding one bit of the abovementioned mode register 221 of FIG. 4. Now, since the mode is the reading-out mode in Mode I (sequential access mode), b3=1 and b4=1. Next, the circuit selection signal CE is set to be L at step #25, and then at step #26, data set at #24 are transferred to the film cartridge. By this, the memory in the film cartridge is set in the data output mode of sequential access as abovementioned. At step #27, serial clock pulses are transferred to the cartridge, and thereby predetermined data from the memory in the film cartridge is inputted into CPU. CPU stores the input data into a corresponding RAM, and at step #29, serial clock pulses for 1 byte are transferred to the film cartridge. Data is transferred from the memory in the film cartridge to CPU in such an order as determined by the address counter 210 as abovementioned. Similarly to the step #28, at step #30, CPU stores data into a corresponding RAM. Thereafter by repeating the operations from outputting a clock pulse (#29) to storing data into RAM (#30), predetermined data can be read out of the memory in the film cartridge in a predetermined order. When necessary data are all inputted, the signal CE is turned to H at step #31, and the data communication with the film cartridge is completed.

The relation between the kind of data and the order of reading out data is so determined that frequently used data are read out earlier and less frequently used data are read out later. More particularly, data concerning a film speed, a film frame number and a latitude are read out in this order respectively.

FIG. 6 is a flow chart of operations of recording, in sequential access mode, data of a machine (e.g. camera body) into the memory in the film cartridge.

Firstly, at step #32, a communication mode designating data is set in the output register provided in the machine. In this case, b3=1 and b4=0. At step #33, the circuit selection signal CE is set at L and thereafter at step #34, data is outputted. Then, at step #35, a data desired to be recorded is set in the output register, and at step #36, the data is outputted. At the subsequent steps from #37 to #40, the same sequence as carried out at steps #35 and #36 is repeated, whereby a plurality of data can be recorded in the memory in the film cartridge. When the data transfer is completed, at step #41, the signal CE is turned to H and thereby the process is completed. In this case, the kinds of data to be transferred are predetermined and the order of transfer is also predetermined. Similarly to the abovementioned case, the order of data transfer is determined in accordance with the degrees of importance of the data. More particularly, data of photographing year, date, pseudo format data, color temperature data and various kinds of photographing data are transferred in this order respectively.

Figure 8:
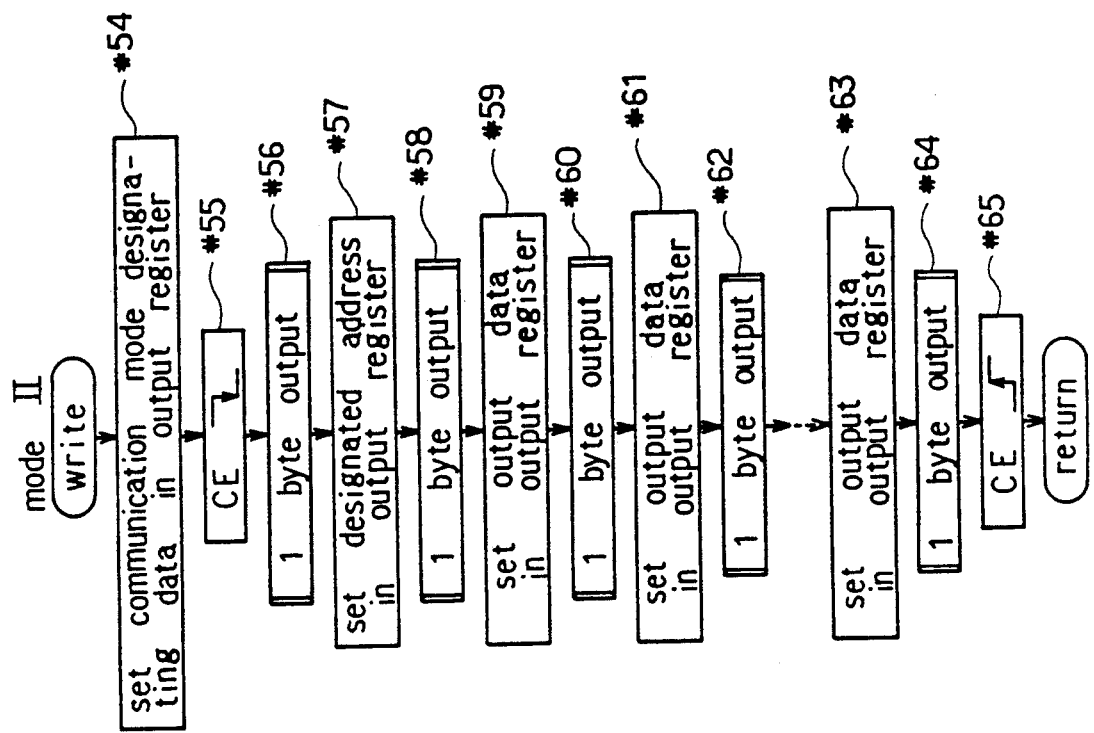
FIG. 8 is a flow chart of writing-in operation of a writer which writes in information into the memory with designating the address thereof.
Figure 7:
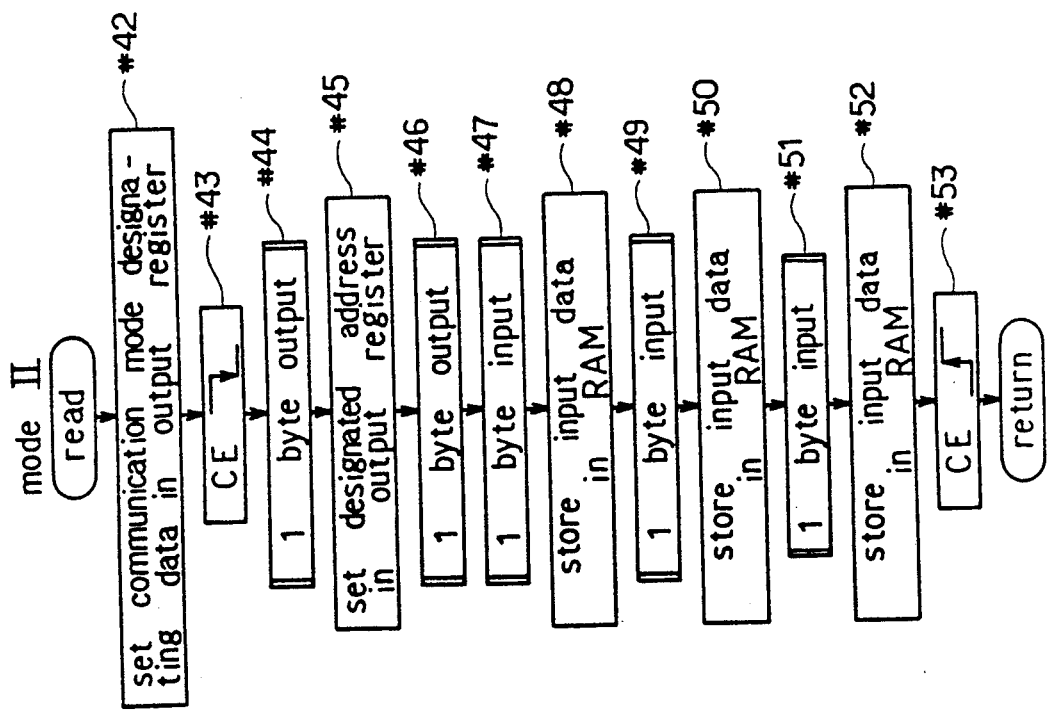
FIG. 7 is a flow chart of reading-out operation of a reader which reads out information stored in the memory by directly designating the address thereof.

FIGS. 7 and 8 are flow charts of operations of reading data out of the memory in the film cartridge and writing data therein respectively in random access mode.

At each of steps #42 and #54, a communication mode designating data is similarly set in the data output register in CPU. At step #42, b3=0 and b4=1 are set. At step #54, b3=0 and b4=0 are set. Then, after the signal CE is turned to L at steps #43 and #55, serial clock pulses are transferred to the film cartridge and at the same time a communication mode designating data is transferred at steps #44 and #56, whereby the memory in the film cartridge is to operate in respective designated mode. At steps #45 and #57, an address for data to be read out or written in by CPU is set in the output register, and transferred at steps #46 and #58. The memory in the film cartridge successively transfers, in read-out mode, data accessed by the designated addresses to CPU in accordance with the serial clock pulses outputted from CPU, and stores, in write-in mode data outputted from CPU. Since the operations subsequent to steps #47 and #59 are the same with those of the abovementioned sequential access, description thereof is omitted. In random access, it is possible to firstly designate an address and then communicate the data, and therefore it is possible to access necessary data whenever the data is required.

In the abovementioned description, the sequence of communication and data are described concerning a camera and a memory in a film cartridge as an example. However, when information such as the date, the time, the designated ways of development and printing, the number of the print, and the size of the print are recorded in the memory in the film cartridge at a photo processing shop, or when the recorded processing data are read out in a photofinishing laboratory, the operations can be carried out according to the same flow chart as used in the abovementioned description. This is the same in the case the information such as the color temperature stored in the memory in the film cartridge are read out and the processing way is recorded in a developing machine, a printer and the like in a photofinishing laboratory, the operations can be carried out according to the same flow chart.

Figure 9:
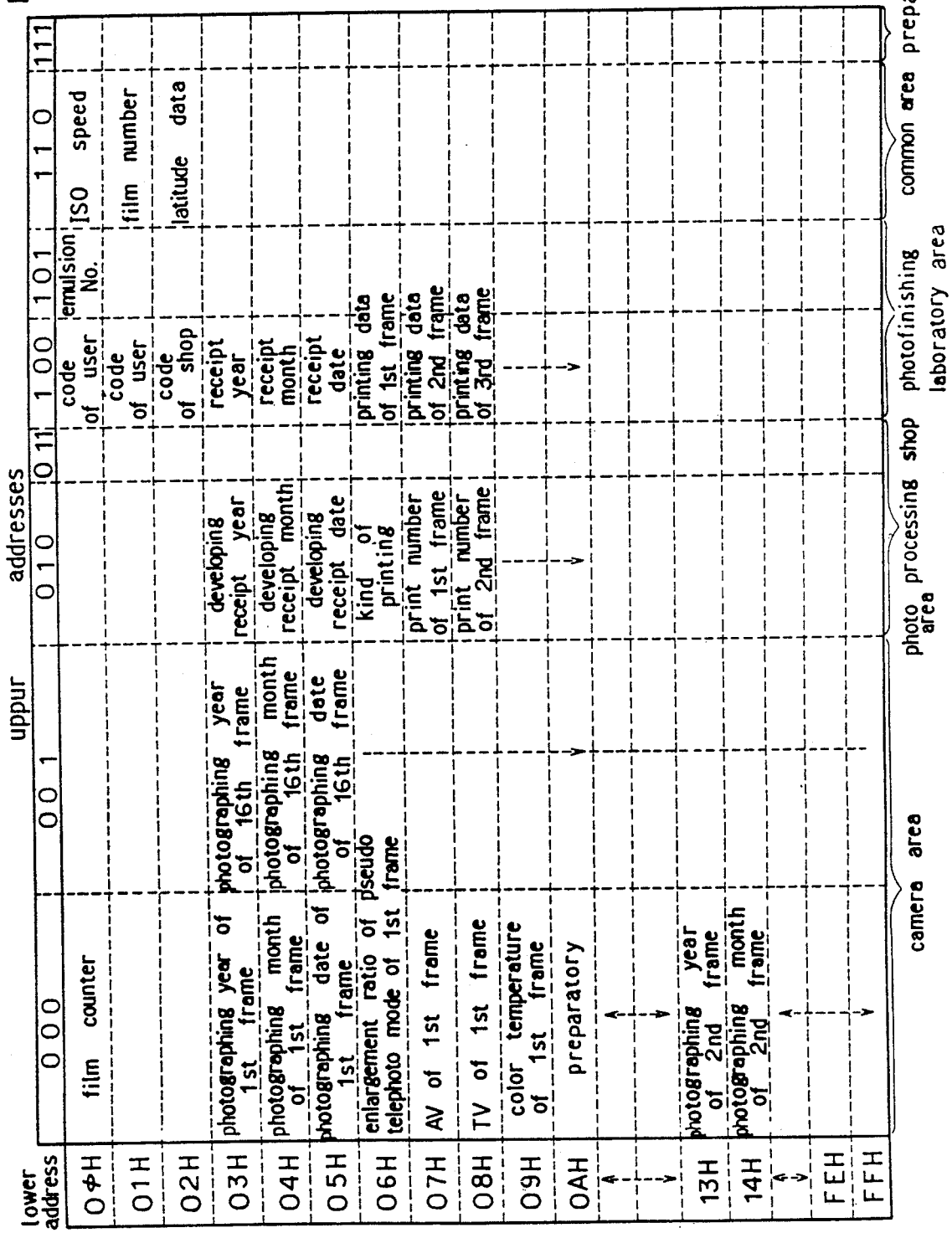
FIG. 9 is a view showing a relation between the address of the memory and the information to be stored.

FIG. 9 is a view showing a relation between addresses of memory cells of the memory in the film cartridge and data.

Addresses designated by the upper three bits are machine designating bits, and are set by the upper three bits b7, b6, b5 of the abovementioned mode register.

A different area of the memory cells are used for each device. As shown in FIG. 9, the memory cells are divided into areas used for recording data in a camera, a photograph processing shop and a photofinishing laboratory, respectively, a common area in which common data such as film characteristic are recorded the common data are used in a camera, a photograph processing shop and a photofinishing laboratory, and a preparatory area for future use. It is to be noted that, for example, the area for a camera is not limited to use in connection with a camera but in connection with a laboratory machine, the data can be read out by transferring a machine designating data corresponding to a camera at the abovementioned mode designating step. In other words, any data in the memory cells is accessible at need.

The lower addresses are represented by hexadecimal notation for simplification of the drawings. A plurality of data corresponding to a film frame are stored in a predetermined order. More particularly, the year, the month, the date, the enlargement ratio of pseudo telephoto mode, the aperture value Av and others are stored in this order. The data concerning the second film frame are stored in the same order in the addresses starting from 10H. In such a manner, all the data are stored in predetermined addresses respectively. The preparatory addresses from OAH to OFH in the drawing are areas for recording a short message, a photographing place and other information.

FIG. 10 is a process descriptive view illustrating flows of a film and ROM-IC among a user U, the photo processing shop D and the photofinishing laboratory L. When a film cartridge is mounted on the camera A, film information such as a film speed stored in the memory are input into the camera A (1).

When the user U carries out a photographing, the memory in the film cartridge stores predetermined information outputted from the microcomputer CPU of the camera including the pseudo format information, the color temperature information, the date, the time and the various photographic information (2). If the user U owns data observing and processing devices including e.g. a CRT display, by using these devices, the user U can for himself record a developing method, a site of photographing, a short message and the like in the memory in the film cartridge (3). This is possible not only when requesting the photo processing shop D of the first development and printing but also when later requesting the shop to do printing.

The user U takes the film cartridge recording the predetermined information in the abovementioned way to the photo processing shop D.

At the photo processing shop D, the film cartridge is set to a reader/writer 33 thereby to record additional data such as a receipt number, a name and a telephone number of the user into the memory in the film cartridge (4). If the user is unable to carry out the abovementioned process (3), such information, e.g. the size and the number of prints, the necessity and the contents of special treatment and the like which used to be written on a paper container bag, is recorded in the film cartridge. The reader/writer 33 has switches corresponding to the respective items to be recorded and is designed to be easy and convenient to use.

The film cartridge received at the photo processing shop D is handed to the photofinishing laboratory L. At the photofinishing laboratory L, the film cartridge is set to the developing device 34 to carry out development based on the data inputted from the memory in the film cartridge whereby a negative film is obtained (5). The negative film and the data of the memory in the film cartridge are set to a printer (not shown) to carry out printing based on the data inputted from the memory whereby prints P are obtained.

In this case, data such as the contents of the developing and the printing treatments, the number of prints and a reference number are recorded in the memory in the film cartridge (6). Further, the reader/writer 36 reads out various data such as photographing data and photographing time from the memory in the film cartridge, and then a central computer 35 processes the read out data statistically, and these processed data may be advantageously utilized to achieve a better photography system (7).

At the photofinishing laboratory L, the film after development is stored in another new film cartridge N. The abovementioned memory in the film cartridge can be itself set to this new film cartridge N. Thereby, the film cartridge can be easily treated in the system of seeing pictures on a CRT display or editing pictures after development.

The negative film cartridge N, the prints P and the cartridge memory recording additional data obtained in the abovementioned manner are returned to the photo processing shop D. At the photo processing shop D, the reader/writer 33 reads out the data recorded in the memory in the film cartridge and automatically calculates and display the processing charge (8).

After the prints P and the negative film cartridge N are returned to the user U from the photo processing shop D, the User U is able to read out the photographing data and the processing data through the personal computer 31 and the reader/writer 33, and the user U is also able to store the abovementioned data into computer memory such as a magnetic disk, a magnetic tape, a bubble memory and the like, or is able to print out the data on recording papers through a printer (not shown). Further, the user U is able to display and see the film images on the CRT display and able to change the images on the CRT display by changing the data such as the pseudo format data, the color designation and the like.

Also, for the user U who does not own the reader/writer 32, the photo processing shop D may provide service to give the user U, when returning the negative film and the prints, a copy on which the information recorded in the memory of the film cartridge are printed out at the shop D or at the photofinishing laboratory L. Further, the photo processing shop D is able to display the film image on the CRT display so that the user can see the same to use this immediately for ordering additional prints or for confirming whether or not the film is of the use's own.

At the photofinishing laboratory L, when carrying out the development and the printing, a number of films are connected together and then processed. This results in a great difficulty in corresponding the respective film frames to the data stored in the memory in the film cartridge. Therefore, in this embodiment, the following procedures are carried out for easily corresponding the respective film frames to the data stored in the memory in the film cartridge. More particularly, as shown in FIGS. 11(A), 11(B), the mark m1 or m2 indicating the correspondence of the address of the memory recording the predetermined data with the film frame number is imprinted in the film F by the mark imprinting section PR. In the case of the mark m2, the film frame can be surely corresponded to the address of the memory by imprinting the mark m2 only in the first frame of the film F.

The mark may be of the numeral type m1 referring to FIG. 11(A) corresponding to the number of exposed frames or may also be of the dot type m2 referring to FIG. 11(B). However, it is to be noted that the numeral type mark m1 is the more reliable in corresponding the film frame to the data stored in the memory in the film cartridge.

FIG. 12 is a perspective view showing a film container 7 according to the present invention. The film container 7 comprises a containing section 71 for a ROM-IC 23 and a containing section 72 for a film. These two sections 71, 72 are so adapted as to be separated at the photofinishing laboratory L, at the photo processing shop D or in a small-sized laboratory apparatus. The ROM-IC container section 71 is provided with seven holes H in correspondence with the respective terminals of ROM-IC 23 shown in FIG. 2 or FIG. 4 for the electrical connection with an outside device (e.g. a camera, a reader/writer used at the photo processing shop, devices used at the photofinishing laboratory, a short-sized laboratory apparatus). In FIG. 12, the ROM-IC containing section 71 is provided on the upper surface of the film container 7. However, it may be provided on the lower surface thereof.

FIG. 13 is a longitudinal sectional view showing the film container 7 of FIG. 12 installed in the camera. The film container is positioned in a film container chamber of the camera by a positioning member (not shown). The ROM-IC containing section 71 is fixed through a duplex adhesive tape onto the upper surface of the film containing section 72 and these two sections 71, 72 are positioned in connection with each other by a positioning means (not shown). A reference numeral 75 denotes a ROM-IC chip wire-bonded directly onto a printed circuit board 73. The printed circuit board 73 is molded of a resin 74 together with the ROM-IC chip 75. However, only the portions to be connected with the outside device are not sealed but are provided with the holes H. A reference numeral 10 denotes contacts of the camera which is urged by a conductive spring 80 against a connecting portion 76 on the printed circuit board 73 in the ROM-IC containing section 71. The conductive spring 80 is connected to a printed circuit board 81 of the camera, and connected through this board 81 to the microcomputer CPU. A hatched portion 84 denotes an inner wall of the camera body.

FIGS. 14-A and 14-B show a first way, different from that of FIG. 13, of fixing the ROM-IC containing section 71 to the film containing section 72, FIG. 14-A being a top view and FIG. 14-B being a longitudinal sectional view. Accordingly to this fixing way, three claws 72b are provided on the film containing portion 72 so that these claws are engaged with three recesses 71b provided in the ROM-IC containing section 71 in such a manner as shown in FIG. 14-B, whereby the ROM-IC containing section 71 is fixed to the film containing section 72.

Figure 15:
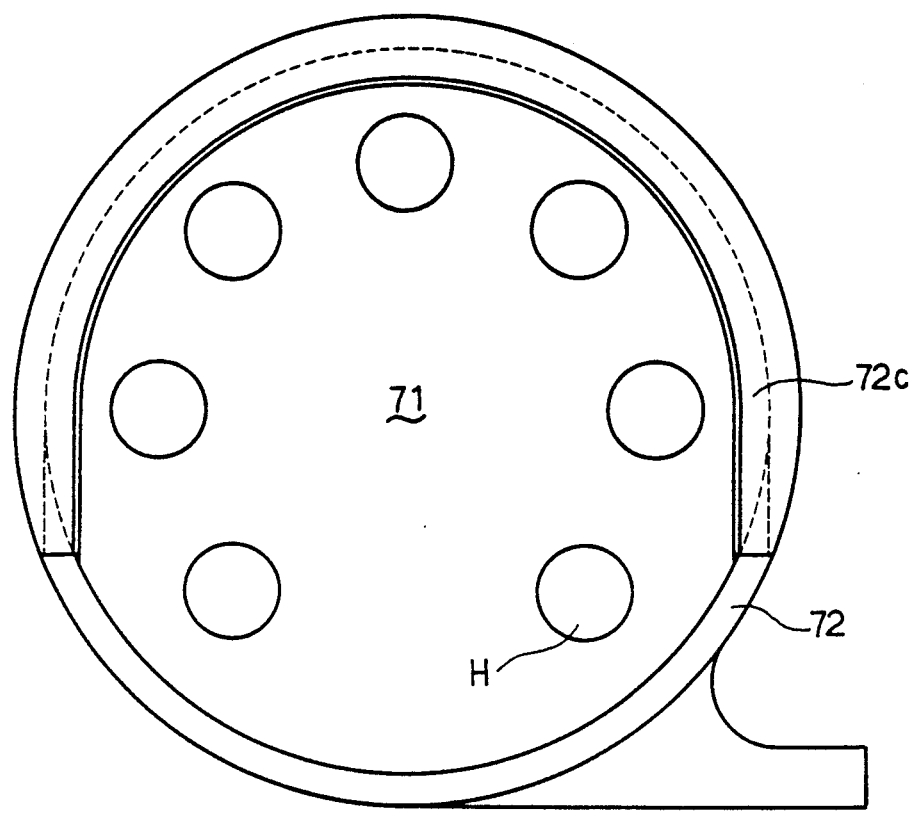
Figure 15:
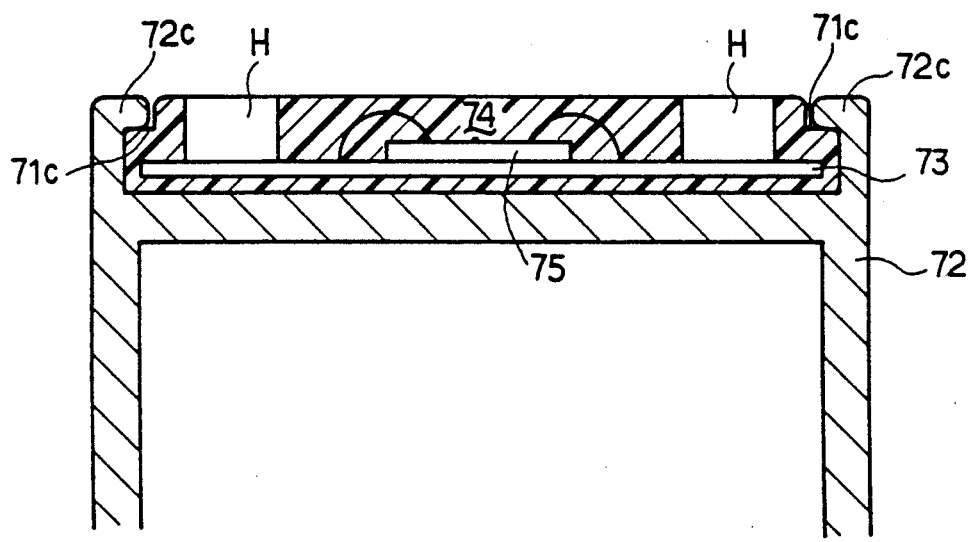

FIGS. 15-A and 15-B show a second way, different from that of FIG. 13, of fixing the ROM-IC containing section 71 to the film containing section 72, FIG. 15-A being a top view and FIG. 15-B being a longitudinal sectional view. A slide frame 72c is provided on the upper surface of the film containing section 72, and a notched portion 71c is provided on the ROM-IC containing section 71 so as to be fitted in the slide frame 72c. Accordingly, by sliding the ROM-IC containing section 71 upwardly from the lower portion of FIG. 15-A, the ROM-IC containing section 71 is fitted to the film containing section 72. And by sliding the ROM-IC containing section 71 in the reverse direction, the ROM-IC containing section 71 can be removed from the film containing section 72. It is desirable to provide an antisliding pawl or the like for preventing a user from erroneously removing the ROM-IC containing section 71 after fitting the same to the film containing section 72.

Figure 16A:
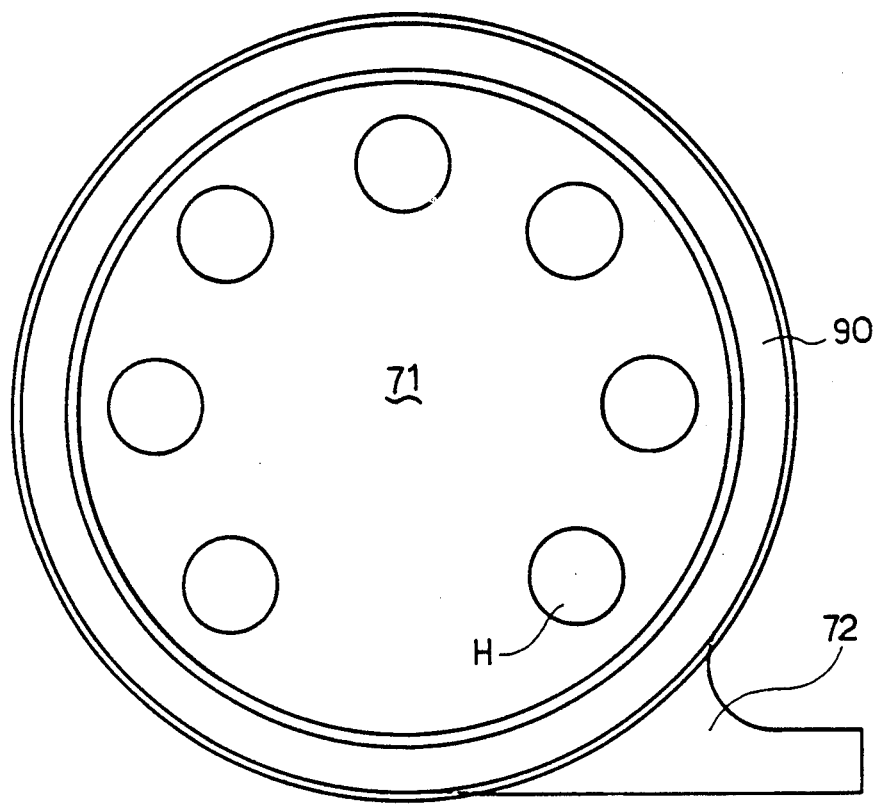
Figure 16B:
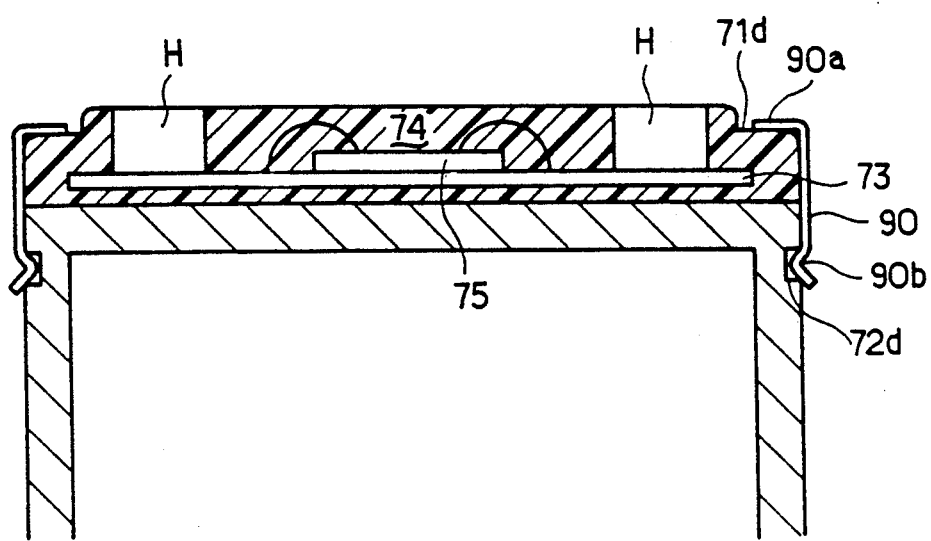

FIGS. 16-A and 16-B show a third way, different from that of FIG. 13, of fixing the ROM-IC containing section 71 to the film containing section 72, FIG. 16-A being a top view and FIG. 16-B being a longitudinal sectional view. One round of recess 72d is provided in the outer wall of the film containing section 72, while a notched portion 71d is provided in the outer circumferential surface of the ROM-IC containing section 71. A bent portion 90a of a pressing metal fitting 90 is urged against the notched portion 71d and a projected portion 90b of the fitting 90 is fitted in the recess 72d of the film containing section 72, whereby the ROM-IC containing section 71 and the film containing section 72 are integrated.

The abovementioned ROM-IC containing section 71 is removed from the film container for photographing (more particularly, the film containing section 72) at the photo processing shop, a photofinishing laboratory or a small-sized laboratory apparatus, and thereafter fitted to another film container (more particularly, another film containing section) for seeing and/or storing the film in one of the abovementioned various kinds of fitting ways to be returned to the use.

FIG. 17 shows another embodiment of a film container. In this embodiment, a part of the side wall of the film containing section 92 is flat, and onto this flat portion, the ROM-IC containing section 91 is fixed similarly as abovementioned. FIG. 18 is a view in which the ROM-IC containing section 91 is fixed onto the back portion of the film containing section 94 of a film container for seeing and/or storing a film.

In the abovementioned embodiments, a film cartridge for photographing is different from a film cartridge for seeing and/or storing a film. However, a single film cartridge may be used for both of these purposes. In this case, it is not necessary to detach the ROM-IC containing section from the film containing section and therefore, these two sections may be integrated.

In the abovementioned embodiments, film containers for roll films are described, but the present invention can be applied to film containers for sheet films. Further, the memory is $E^2PROM$ in the abovementioned embodiments, but in place of the same, a RAM containing a battery and backed up by the battery can be used. Further, when writing in data into $E^2PROM$, a high voltage for write-in operation may be supplied from an outside device. Further, data peculiar to a film such a film speed may be stored in a ROM, and the memory section in and from which writing-in and reading-out are carried out may comprise a nonvolatile memory such as an E²PROM or a RAM having a backing-up battery. Further, in the abovementioned embodiments, the memory section and other circuit section are formed into one IC chip. However, the memory section may be formed into a separate chip thereby to obtain a two chip construction. Further, a microcomputer may be used in the ROM-IC to control the operation of the ROM-IC. In this case, the memory section may be formed by only one-chip microcomputer including the nonvolatile memory, or it may be formed by two chips consisting of a microcomputer and the nonvolatile memory. In the abovementioned embodiment, the IC chip is wire-bonded directly on the base board, but another construction may be used in which the IC chip is molded into an IC package and then this IC package is attached to the base board. Further, the IC chip may be attached to the base board by putting solder directly on a pad on the IC chip to attach through the solder (bump method). Further, in the abovementioned embodiments, the data communication is a serial communication using a synchronized clock, but it may be a serial communication of start-stop type, and further, for compativility with various communication systems, it may be possible to input a communication system exchange signal and adopt a communication system in correspondence with the signal. Furthermore, it may be possible to carry out a parallel data communication for the case in which a number of film container are treated at the photofinishing laboratory. In this case, terminals for a parallel data communication are provided on the back face of the base board to which the IC chip is attached.

In a device (especially a camera) using the film container, it is possible to read out data without transferring address data at the reading-out time (sequential access mode) and to transfer address data and write-in data at the writing-in time (random access mode).

As abovementioned, in a film cartridge according to the present invention, since photographing data are stored in different memory area at each photographing time, photographing data recorded before are prevented from being deleted and photographing data concerning a desired photographed film frame are accessible. Further, it is possible to provide a semiconductor memory in the film cartridge and thereof, one film cartridge can be prevented from being mistaken for another at a photo processing shop, a photofinishing laboratory and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A film cartridge comprising:
a film chamber in which a film for recording a visual image of each photograph is contained; and
a semiconductor memory including a first and a second memory area, wherein said first memory area stores data corresponding to the characteristics of the film and said second memory area has a plurality of regions for storing the photographing data relating to each photograph.

2. A film cartridge as claimed in claim 1, wherein said semiconductor memory is a nonvolatile memory.

3. A film cartridge as claimed in claim 2, wherein said semiconductor memory is an E²PROM.

4. A film cartridge as claimed in claim 1, wherein the photographing data is chronometric data.

5. A film cartridge as claimed in claim 1, wherein the photographing data is pseudo format data.

6. A film cartridge as claimed in claim 1, wherein the photographing data is aperture data.

7. A film cartridge as claimed in claim 1, wherein the photographing data is exposure time data.

8. A film cartridge as claimed in claim 1, wherein the photographing data is data indicating color temperature of an object.

9. A film cartridge as claimed in claim 1, wherein the photographing data is data which is set by a user.

10. A film cartridge as claimed in claim 1, further comprising:
means for inputting the photographing data; and
means for writing the photographing data in said semiconductor memory.

11. A film cartridge as claimed in claim 10, further comprising;
address controller for appointing by random access or sequential access an address of the memory in which said writing means writes data; and
means for selecting one of the random access mode and the sequential access mode.

12. A film cartridge as claimed in claim 1, wherein the data of the film characteristic is film speed data.

13. A film cartridge as claimed in claim 1, wherein the data of the film characteristic is data indicating the frame number of the film.

14. A film cartridge as claimed in claim 1, wherein the data of the film characteristic is latitude data.

15. A film cartridge as claimed in claim 1, further comprising:
means for reading out data stored in the semiconductor memory.

16. A film cartridge as claimed in claim 15, further comprising:
address controller for appointing by random access or sequential access an address of the memory the data in which is read out by said reading means; and
means for selecting one of the random access mode and the sequential access mode.

17. A film cartridge as claimed in claim 1, wherein said stored data in the second memory area includes data input at a photo processing shop.

18. A film cartridge as claimed in claim 17, wherein the data input at a photo processing shop is data of the number of a print.

19. A film cartridge as claimed in claim 17, wherein the data input at a photo processing shop is a kind of a print.

20. A film cartridge as claimed in claim 1, wherein said stored data in the second memory area includes data which is used at a photofinishing laboratory.

21. A film cartridge including a recording medium comprising:
a first section for storing a visual image of each photograph; and
a second section including a first and a second portion, wherein said first portion stores data characteristic of the film, and the second portion has a plurality of regions for storing each photographing data relating to each photograph respectively, wherein said second section consists of a semiconductor memory.

22. A film cartridge as claimed in claim 21, wherein said second section is formed on one semiconductor chip.

23. A film cartridge as claimed in claim 22, wherein the first portion of the second section is formed on a ROM part in said semiconductor chip and the second portion of the second section is formed on a nonvolatile memory part in said semiconductor chip.

24. A film cartridge as claimed in claim 21, wherein said second section further includes a third portion for storing data input at a photo processing shop.

25. A film cartridge as claimed in claim 21, wherein said second section further includes a fourth portion for storing data used at a photofinishing laboratory.

26. A film cartridge comprising:
a film chamber in which a film for recording a visual image of each photograph is contained; and
a memory including a first and a second memory area, wherein said first memory area stores data corresponding to the characteristics of the film and said second memory area has a plurality of regions for storing the photographing data relating to each photograph.

27. A film cartridge including a recording medium comprising:
a first section for storing a visual image of each photograph; and
a second section including a first and a second portion, wherein said first portion stores data characteristic of the film, and the second portion has a plurality of regions for storing each photographing data relating to each photograph respectively.

* * * * *